United States Patent [19]

Su et al.

[11] Patent Number: 6,047,339
[45] Date of Patent: Apr. 4, 2000

[54] BUFFERING DATA THAT FLOWS BETWEEN BUSES OPERATING AT DIFFERENT FREQUENCIES

[75] Inventors: Sam Su, Rowland Heights; Vi Chau, Laguna Niguel; Dan Tarr, Irvine, all of Calif.

[73] Assignee: Emulex Corporation, Costa Mesa, Calif.

[21] Appl. No.: 08/957,856

[22] Filed: Oct. 27, 1997

[51] Int. Cl.[7] .................................................. G06F 13/00
[52] U.S. Cl. ........................... 710/56; 710/57; 710/128; 710/129
[58] Field of Search .................................. 395/306, 309, 395/312, 287, 728, 880, 871, 204.42, 325; 710/52–57, 60–61, 29, 126–130

[56] References Cited

U.S. PATENT DOCUMENTS

| | | | |
|---|---|---|---|
| 4,463,443 | 7/1984 | Frankel | 395/880 |
| 4,829,475 | 5/1989 | Ward et al. | 365/78 |
| 5,224,093 | 6/1993 | Denzel et al. | 370/60 |
| 5,261,059 | 11/1993 | Hedberg et al. | 395/325 |
| 5,305,253 | 4/1994 | Ward | 365/73 |
| 5,426,639 | 6/1995 | Follett et al. | 370/94.1 |
| 5,444,853 | 8/1995 | Lentz | 395/250 |
| 5,497,467 | 3/1996 | Wakui et al. | 395/312 |
| 5,524,270 | 6/1996 | Haess | 395/880 |
| 5,546,347 | 8/1996 | Ko et al. | 365/221 |
| 5,587,953 | 12/1996 | Chung | 365/220 |
| 5,592,629 | 1/1997 | Gamble | 395/871 |
| 5,664,122 | 9/1997 | Rabe et al. | 395/308 |
| 5,758,166 | 5/1998 | Ajanovic | 395/728 |
| 5,761,450 | 6/1998 | Shah | 395/287 |
| 5,812,774 | 9/1998 | Kempf et al. | 395/200.42 |
| 5,815,677 | 9/1998 | Goodrum | 395/306 |
| 5,859,988 | 1/1999 | Ajanovic | 395/309 |

*Primary Examiner*—Christopher B. Shin
*Attorney, Agent, or Firm*—Fish & Richardson P.C.

[57] ABSTRACT

A "virtual FIFO" system for use in buffering data between transacting buses that transfer data at different rates includes a memory device and a controller that partitions the memory device into multiple regions, each of which is configured to operate as a distinct data buffer.

18 Claims, 3 Drawing Sheets

96-WORD DATA TRANSFER (WRITE CLOCK IS TWICE AS FAST AS THE READ CLOCK)
TIMING 1

6,047,339

BUFFERING DATA THAT FLOWS BETWEEN BUSES OPERATING AT DIFFERENT FREQUENCIES

TECHNICAL FIELD

The invention relates to data buffering, and more particularly to buffering data that flows between buses operating at different frequencies.

BACKGROUND INFORMATION

A typical computer system includes multiple data buses that facilitate the flow of data between various components of the system. In general, the data buses are of different types that operate according to different functional standards, such as the Industry-Standard Architecture (ISA), Extended Industry-Standard Architecture (EISA), Peripheral Component Interface (PCI), and Small Computer System Interface (SCSI) standards. Among the characteristics that distinguish the different types of data buses is operating frequency, or the rate at which a bus transfers data among components residing on the bus. In a typical computer system, data routinely is transferred between devices located on different buses operating at different frequencies. For example, a microprocessor located on a host bus operating at 50 MHz often must deliver data to a device located on a PCI bus operating at 8 MHz. To compensate for such disparities in operating frequency, the computer system must include a buffering system between the data buses.

Conventional buffering systems employ standard memory devices as first-in, first-out (FIFO) buffers. A typical FIFO buffer usually has two ports, one of which receives data from a first bus at a first data rate while the other delivers the data to a second bus at a second data rate. FIFO buffering schemes require careful synchronization of read and write controllers to prevent data from overflowing or underflowing the FIFO buffers. Some FIFO buffering schemes use multiple memory devices to create multiple FIFO buffers, such as in the well-known "double-buffering" techniques, where one of a pair of separately addressable buffers has data written to it while the other buffer is being read. The roles of the separate buffers are periodically switched.

Various techniques have been used to work around the buffer synchronism problem. One technique is to have the write side and the read side of a single buffer operate in a mutually exclusive fashion. Write control logic puts data into the buffer until the buffer is full, and then signals read control logic to start reading the content. When the reading is completed, the read control logic signals the write control logic to start filling the buffer again. This process continues until all data is transferred. This is a fool-proof method to guarantee the data integrity, but the drawback is long latency since at least one side of the buffer is idle at any given time.

Another method of determining FIFO full/empty status is by comparing the read and the write pointers of a FIFO. If the two pointers line up and the last operation is a write command, the FIFO is full. If the last operation is a read command when the two pointers lines up, the FIFO is empty. This method works well when the read and write control logic are both running at the same clock speed. When the two sides are running at two different clock speeds, there is a potential to produce an erroneous or inconclusive empty/full status, and thus there may be a danger of data corruption.

Accordingly, the inventors have concluded that a better approach is need to buffering data that flows between buses operating at different frequencies. The present invention provides a system and method for achieving this objective.

SUMMARY

The invention features a "virtual FIFO" system for use in buffering data between transacting buses that transfer data at different rates. The system includes a memory device partitioned into multiple banks, each of which is configured to operate as a distinct data buffer. Such partitioning may be done on a dynamic, "on-the-fly" basis. The invention eliminates the possibility of FlIFO status ambiguity while maintaining FIFO efficiency by allowing both read and write operations to operate concurrently.

In the preferred embodiment, the memory device is a two-port (one read, one write) random access (RAM) device configured as a FIFO. A two-port RAM allows independent and random access to any location of the RAM from both the read and the write side of the FIFO. A write controller generates a write strobe to the RAM and controls write address generation. A read controller is responsible for controlling read address generation.

While the RAM FIFO allows read and write access concurrently, for any particular bank, only one of the two operations is allowed, such that the read controller and the write controller never access the same logical bank at the same time. This prevents all overflow and underflow conditions.

In one embodiment, the system includes status flags associated with each data buffer, one flag indicating whether data may be written to the data buffer, and another flag indicating whether data may be read firom the data buffer. The status flags may be stored in the memory device itself or in another memory structure. In an alternative embodiment, a single binary status flag is used to indicate the read/write state of the data buffer.

In another embodiment, the controller that partitions the memory device into multiple data buffer banks also manages data flowing into and out of the data buffers. The controller may include separate write and read controllers, which may use the status flags discussed above to determine when to write data to and read data from the data buffers.

Advantages of the invention include one or more of the following:

Using a single memory device to create multiple data buffers yields an efficient and effective data buffering system that is less expensive than previous systems.

Data from one or more data transactions may be written to and read from the buffering system in an interleaved, concurrent fashion.

A single memory device may be used to buffer data between two buses operating at different frequencies without underflowing or overflowing, regardless of a substantial disparity in the buses' operating frequencies.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
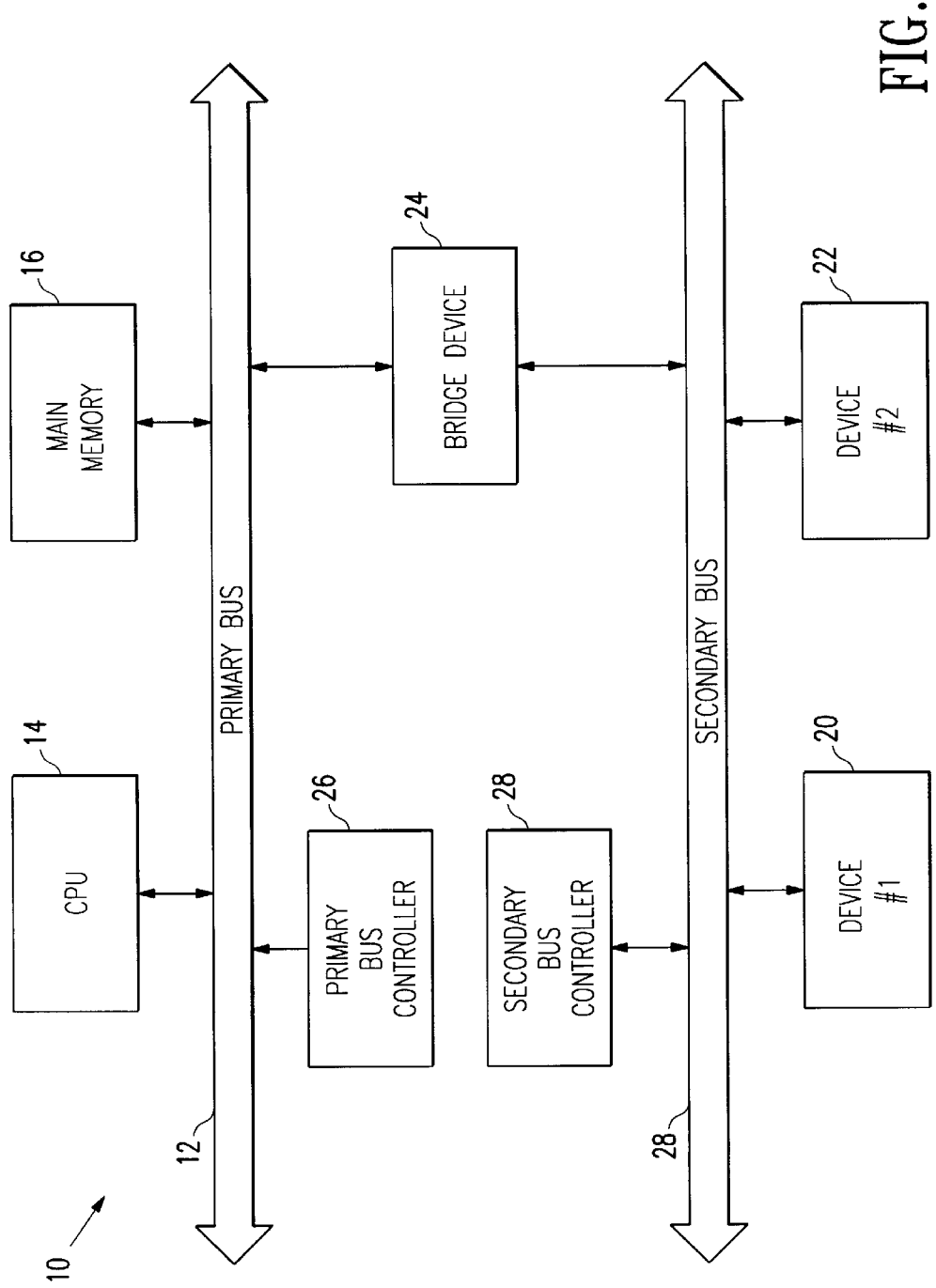
FIG. 1 is a block diagram of various components in a computer system.

Referring to FIG. 1, a computer system 10 includes at least two data buses that facilitate data transfers among components of the computer system. One of these data buses, the primary bus 12, is a "host" bus dedicated to carrying out data transactions involving the computer's central processing unit (CPU) 14 and main memory 16. The host bus 12 operates at a first frequency (e.g., 50 MHz). A secondary bus 18 carries out transactions involving other devices 20, 22 in the computer system 10, including transactions between the devices 20, 22 themselves, as well as transactions between one or more of the devices 20, 22 and the CPU 14. The secondary bus, which may be any type of data bus (e.g., ISA, EISA, PCI, SCSI), operates at a second frequency (e.g., 8 MHz). The devices 20, 22 residing on the secondary bus 18 may be any types of devices, including peripheral devices such as a video card or a network interface card (NIC), and input/output (I/O) devices such as a keyboard or a printer.

The primary bus 12 and the secondary bus 18 are connected by a bridge device 24 which manages data transactions between the two buses. The bridge device 24 may serve both as a translator to interpret commands originating on one bus for delivery to the other bus and as a buffering system for data transfers associated with the commands. The buffering scheme employed by the bridge device 24 is described below. A primary bus controller 26 manages competing requests from the CPU 14 and the bridge device 24 for access to the primary bus 12, in known fashion. Likewise, a secondary bus controller 28 manages competing requests from the secondary devices 20, 22 and the bridge device 24 for access to the secondary bus 18.

Figure 2:
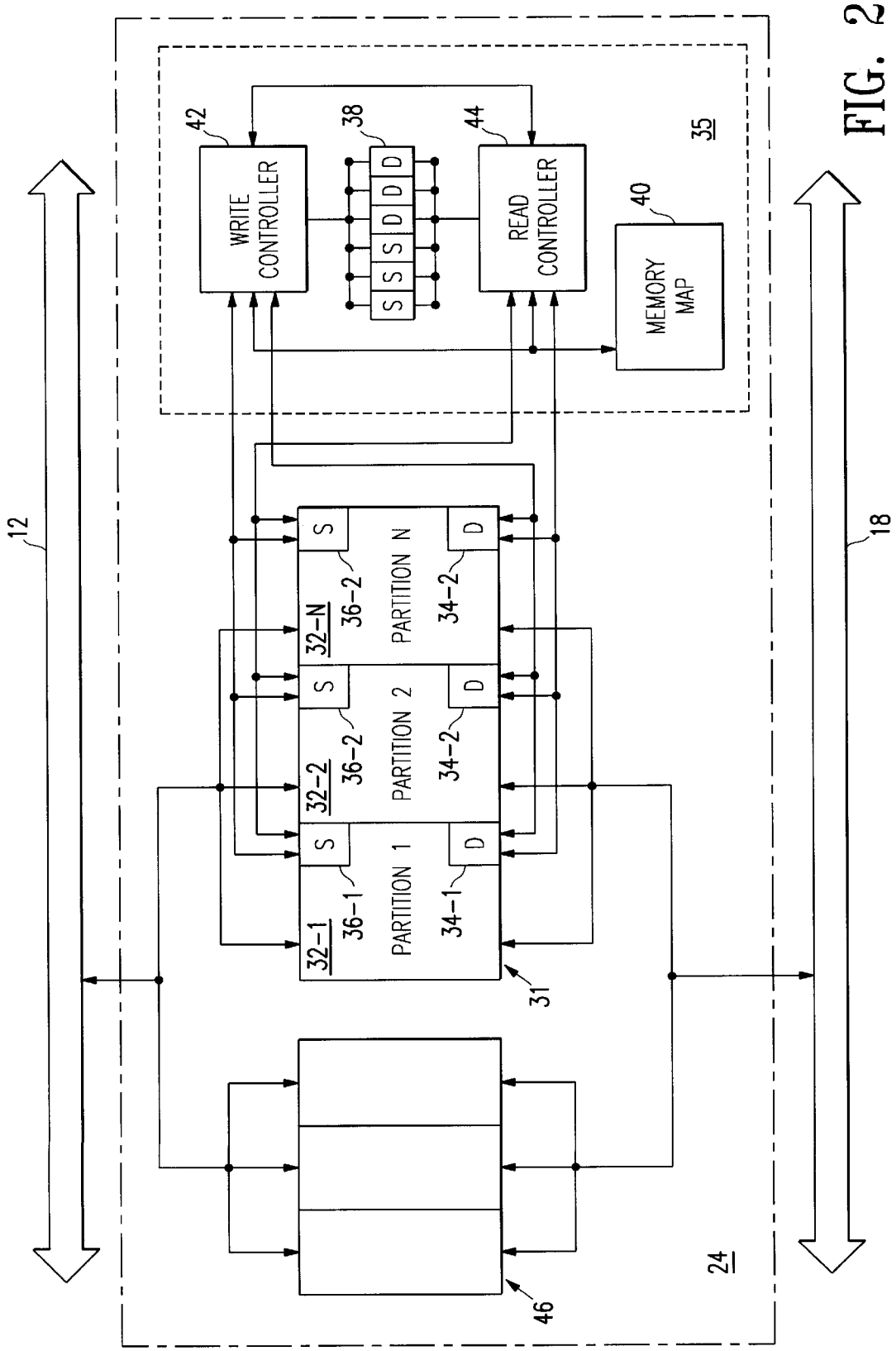
FIG. 2 is a block diagram of a system for buffering data that flows between data buses operating at different frequencies.

Referring to FIG. 2, the bridge device 24 employs a "virtual FIFO" buffering scheme in which a single FIFO memory device 31 is partitioned into N distinct memory regions ("banks") 32-1, 32-2, . . . 32-N by a controller 35. Preferably, each bank comprises a continuous block of memory addresses. The controller 35 treats the banks 32-1, 32-2, . . . 32-N as distinct FIFO buffers, each of which may store data independently of or in conjunction with the other banks. For example, the banks 32-1, 32-2, . . . 32-N may be used individually to buffer data associated with multiple distinct transactions, or they may be used together to buffer data associated with fewer but larger transactions. A bank may range in size from one word (e.g., two bytes) of data to the entire storage capacity of the memory device 31. Therefore, the memory device 31 may contain as few as one bank, or it may contain as many banks as data words that it can store. The trade off is the number of status flags that the read and write controllers need to track, the complexity of the controller, and the efficiency of the FIFO. That is, as N grows bigger, the FIFO efficiency increases, but the number of status flags and the complexity of the controller also increases. In the illustrated embodiment, a memory map 40 created and maintained by the controller 35 identifies the memory addresses that define the boundaries of the banks 32-1, 32-2, . . . 32-N, regardless of how many banks have been created.

A write controller 42 manages the flow of data into the banks 32-1, 32-2, . . . 32-N, and a read controller 44 manages the flow of data out of the banks. The write and read controllers 42, 44 may be implemented, for example, as state machines. The write and read controllers 42, 44 allow data to be written to one bank and read from another bank in the memory device 31 concurrently. The controllers 42, 44 ensure the integrity of data in the buffers by allowing a device to begin writing data into a bank only when the bank is empty, and to begin reading from a bank only when the bank is full.

Each bank 32-1, 32-2, . . . 32-N has at least two associated status flags: a "done" flag 34-1, 34-2, . . . 34-N that indicates to the write controller 42 that the corresponding bank 32-1, 32-2, . . . 32-N is empty and can accept data from a writing device; and a "start" flag 36-1, 36-2, . . . 36-N that indicates to the read controller 44 that the corresponding bank is full and therefore can provide data to a reading device. The write controller 42 clears the "done" flag for a bank when a writing device begins placing data into the bank. The write controller 42 then sets the bank's "start" flag when the bank is full or, alternatively, when the writing device concludes its data transfer before the bank is full. Likewise, the read controller 44 clears the "start" flag for a bank when a reading device begins taking data from the bank and then sets the "done" flag when the bank is empty. In a preferred embodiment, the "start" and "done" flags are both cleared at the beginning of a data transfer and at "power on"

For maximum data integrity, the "start" flag of a bank is also used to clear the "done" flag of that same bank, and the "done" flag is used to clear the "start" flag of the bank. Such an interlock hand-shake mechanism allows the clock rates from both side of the FIFO to be completely independent of each other and there is no limit on the operation range.

The "start" and "done" flags may be stored in any of several locations, including the following: within the banks 32-1, 32-2, . . . 32-N, within the memory device 31 but outside of the banks 32-1, 32-2, . . . 32-N, or in another memory structure 38, such as a register (register 38 will not be present if the "start" and "done" flags are stored in the memory device 31). Alternatively, the write and read controllers 42, 44 may keep internal "start" and "done" flags, and each controller 42, 44 may send a message directly to the other controller 44, 42 upon filling or emptying a buffer.

In an alternative embodiment, a single binary status flag is used to indicate "start" and "done." In this case, the write controller 42 cannot write to a bank until the flag for the bank is set to "done." The write controller 42 then writes to that bank, and, when done writing, resets the corresponding flag to "start." Similarly, the read controller 44 cannot read from a bank until the corresponding flag is reset to "start." After reading all of a bank, the read controller 44 sets the corresponding flag to "done." However, in this embodiment, care should be taken to prevent a "race" condition, where one controller is reading the state of a flag and acting on it while the other controller is changing the flag.

To ensure that the "virtual FIFO" buffering scheme functions properly regardless of the data transfer rates of the data buses 12, 14, the write controller 42 synchronizes its setting of the "start" flags to the read controller's internal clock (not shown), and the read controller 44 synchronizes its setting of the "done" flags to the write controller's internal clock (not shown). The "start" and "done" flags provide a mechanism that ensures that the read and write controllers 42, 44 never access the same logical bank at the same time. This prevents all overflow and underflow conditions. The "virtual FIFO" buffering scheme provides sufficient buffering despite wide differences in the operating frequencies of the data buses.

In addition to at least one memory device 31 having multiple data buffer banks, the bridge device 24 may include one or more additional memory devices 46, each of which also may be partitioned as described above. In this situation, memory controller 35 may be used to manage all memory devices in the bridge device 24, or a separate memory controller may be provided for each memory device in the bridge.

Each of the memory devices 31, 46 may be embodied in a single random access memory (RAM) integrated circuit. Alternatively, such memory devices 31, 46 may be embodied in a memory module (e.g., a SIMM or DIMM) comprising such integrated circuits and functioning as a single addressable device. In either case, the memory devices 31, 46 may include volatile or non-volatile memory, and may be of any RAM type (e.g., DRAM, SRAM, EDO-RAM, etc.), but is preferably static RAM. The memory devices 31, 46 may be partitioned into banks of equal size, or the banks may be of different sizes, which may be useful, e.g., in applications using asymmetric data transfers. Each memory device may be permanently partitioned once, or the banks may be defined dynamically as needed. The "start" and "done" flags described above typically will be a single bit in length, but flags of other sizes (e.g., nibbles, bytes, words, etc.) also may be used. Alternatively, as noted above, a single bit may be used for each "start" and "done" flag pair (i.e., toggling between high and low logic levels may be used to indicate the "start" and "done" conditions).

Optionally, each bank may have an associated "last" flag, which indicates that a bank is the last bank for a current data transfer operation. In such a configuration, data is written into the FIFO in the sequential fashion (i.e., bank 32-1 is written until full, then bank 32-2, . . . ,32-N, and back to bank 32-1. Data is read out in a similar sequential fashion.

After a bank is filled, the write controller 42 sets the corresponding "start" flag for the bank. As the last location of a bank is written, the write controller 42 checks the "start" flag of the next bank. If that "start" flag is cleared (the bank is empty), the write controller 42 will continue the write operation. If the "start" flag of the next bank is not cleared (the bank is not empty), the write operation will pause. However, the write controller 42 continues to monitor the "start" flag of the next bank. When the "start" flag becomes cleared, the write operation resumes. As the last word of the data transfer is written into a bank, the write controller 42 sets the "start" flag of the bank (even though the bank may or may not be full), and also sets the "last" flag of the bank.

The read controller 44 reads from the banks having set "start" flags. After a bank is read out, the read controller 44 sets the "done" flag of that bank, indicating that the bank is available for writing. When the last location of a bank is read, the read controller 44 checks the "start" flag of the next bank. If the "start" flag is set (the bank is ready), the read controller 44 continues the read operation. If the "start" flag is not set (the bank is not ready), the read operation will pause. However, the read controller 44 continues to monitor the "start" flag of the next bank. When the "start" flag becomes set, the read operation resumes. If the current bank has both the "start" and the "last" status flags set, the read controller 44 knows that this is the last bank for the current data transfer operation. Accordingly, the read controller 44 reads data from the bank until the read pointer aligns with the write pointer, and then sets the "done" flag for the bank.

In an alternative embodiment, the number of bytes or words in each write operation is communicated to the read controller 44 directly. In this configuration, a "last" status flag is not needed.

Figure 3:
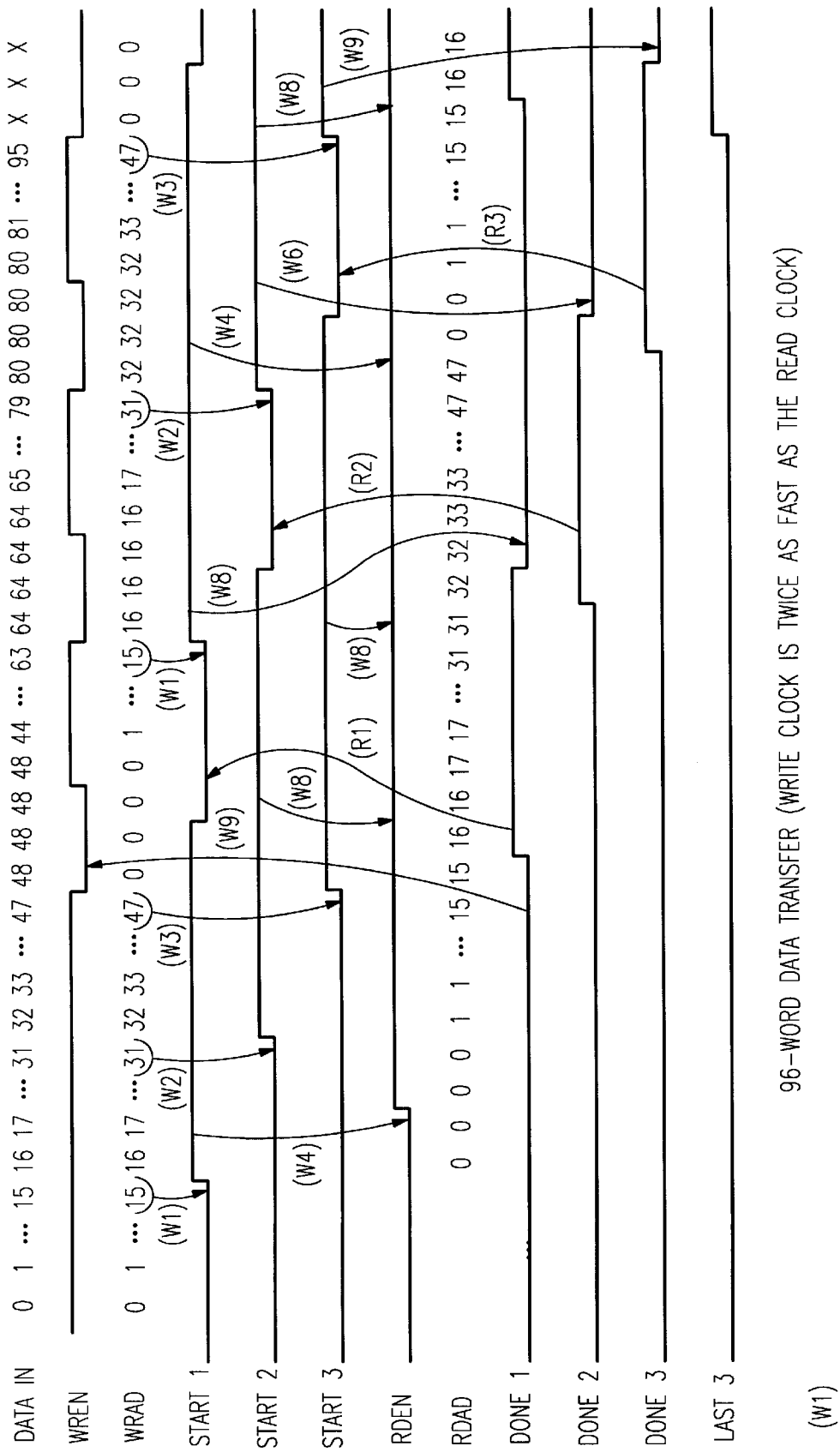
FIG. 3 is a timing diagram for one embodiment of the invention.

FIG. 3 is a timing diagram for one embodiment of the invention. The timing diagram shows a 96-word data transfer using a configuration in which the width of the FIFO memory device 31 is 32 words with a depth of 48 rows, and the device is partitioned into 3 banks. The handshake between the "start" bits and the "done" bits is also shown. In this example, the write clock is twice as fast as the read clock. The following annotations describe the sequence of events:

(W1) After writing to the last location of bank1, a start1 flag is set.

(W2) After writing to the last location of bank2, a start2 flag is set.

(W3) After writing to the last location of bank3, a start3 flag is set.

(W4) Setting of start1 causes the read controller to start reading.

(W5) After filling up bank1 for the second time, a done1 flag is reset.

(W6) After filling up bank2 for the second time, a done2 flag is reset.

(W7) After filling up bank3 for the second time, a done3 flag is reset.

(W8) After reading each bank, the read controller checks for the start bit of the next bank. In this case, it is set, so the read continues.

(W9) WREN is disabled (stop writing to FIFO) because after finishing bank3, the write controller notices that start1 is still set (bank1 is not empty). The writing operation continues after start1 is cleared.

(R1) After reading the last location in bank1, done1 is set which resets start1.

(R2) After reading the last location in bank2, done2 is set which resets start2.

(R3) After reading the last location in bank3, done3 is set which resets start3.

(R4) After reading the last location in bank3, the read controller detects that the start bit of the next bank (bank1) is not set, so it stops the read operation.

A number of embodiments of the present invention have been described. Nevertheless, it will be understood that various modifications may be made without departing from the spirit and scope of the invention. For example, while the invention has been described in terms of data transactions involving a host bus, the invention may be used for data transactions between other types of buses, such as PCI-to-PCI bus transactions or PCI-to-I/O bus transactions. Accordingly, other embodiments are within the scope of the following claims.

What is claimed is:

1. A first-in-first-out (FIFO) bridge device for managing data transfers between a source bus and a destination bus each operating at a different rate, comprising:

a memory device dynamically partitionable into a variable number of N distinct memory banks, each memory bank storing data to be transferred from the source bus to the destination bus during a data transfer operation; and a controller operable to partition the memory device and including a write controller and a read controller co-operable to set status flags in a manner preventing writing to any of the memory banks until any data previously stored therein is read out.

2. The bridge device of claim 1, wherein the bridge device is a single integrated circuit.

3. The bridge device of claim 2, wherein the memory device is dynamically partitioned by the controller to maximize data flow rate from the source bus to the destination bus.

4. The bridge device of claim 3, wherein the controller dynamically partitions the memory device in response to a set of externally input parameters.

5. The bridge device of claim 4, wherein the bridge device is a single integrated circuit and the externally input parameters are programmed inputs to the integrated circuit.

6. The bridge device of claim 4, wherein the externally input parameters includes information about the length of each data transfer.

7. The bridge device of claim 4, wherein the externally input parameters includes the value of variable number N of the distinct memory banks into which the memory device is to be partitioned.

8. The bridge device of claim 4, wherein the externally input parameters includes information about a desired size of each of the N distinct memory banks.

9. In a FIFO bridge device including a controller and a memory device, a method of managing data transfers between a source bus and a destination bus each operating at a different rate, comprising the controller performed steps of:

dynamically partitioning the memory device, in response to a set of externally input parameters, into a variable number of N distinct memory banks, each memory bank for storing data to be transferred during a data transfer operation;

writing data into a first memory bank of the N distinct memory banks;

setting a flag when the first memory bank is full;

writing data into a second memory bank of the N distinct memory banks;

checking the flag of the first memory bank to determine if it is full; and initiating a readout of the data stored in the first memory bank when the flag is set to full.

10. The method of claim 9, wherein the bridge device is a single integrated circuit and the externally input parameters are programmed inputs to the integrated circuit.

11. The method of claim 9, wherein the externally input parameters includes information about the length of each data transfer.

12. The method of claim 9, wherein the externally input parameters includes the value of the variable number N of the distinct memory banks into which the memory device is to be partitioned.

13. The method of claim 9, wherein the externally input parameters includes information about a desired size of each of the N distinct memory banks.

14. The method of claim 9, wherein the memory device is dynamically partitioned to maximize data flow rate from the source bus to the destination bus.

15. The method of claim 9, wherein the step of initiating the readout is performed before the second memory bank becomes full.

16. The method of claim 15, wherein the step of initiating readout is executed simultaneously with the writing of data in the second memory bank.

17. The method of claim 16, further comprising the steps of reading out the data from the first memory bank and setting a done status flag when reading out of data stored therein is complete.

18. The method of claim 16, wherein the controller includes a read controller and a write controller, the method further including the steps of:

setting, by the write controller, a last status flag after the last word is written into the second memory bank, and detecting, by the read controller, the last status flag and reading out the data in the second memory bank after the first memory bank is readout.

* * * * *